June 4, 1963     E. KUHNLE     3,092,314
PRICE INDICATING WEIGHING APPARATUS
Filed Oct. 6, 1960     2 Sheets-Sheet 2

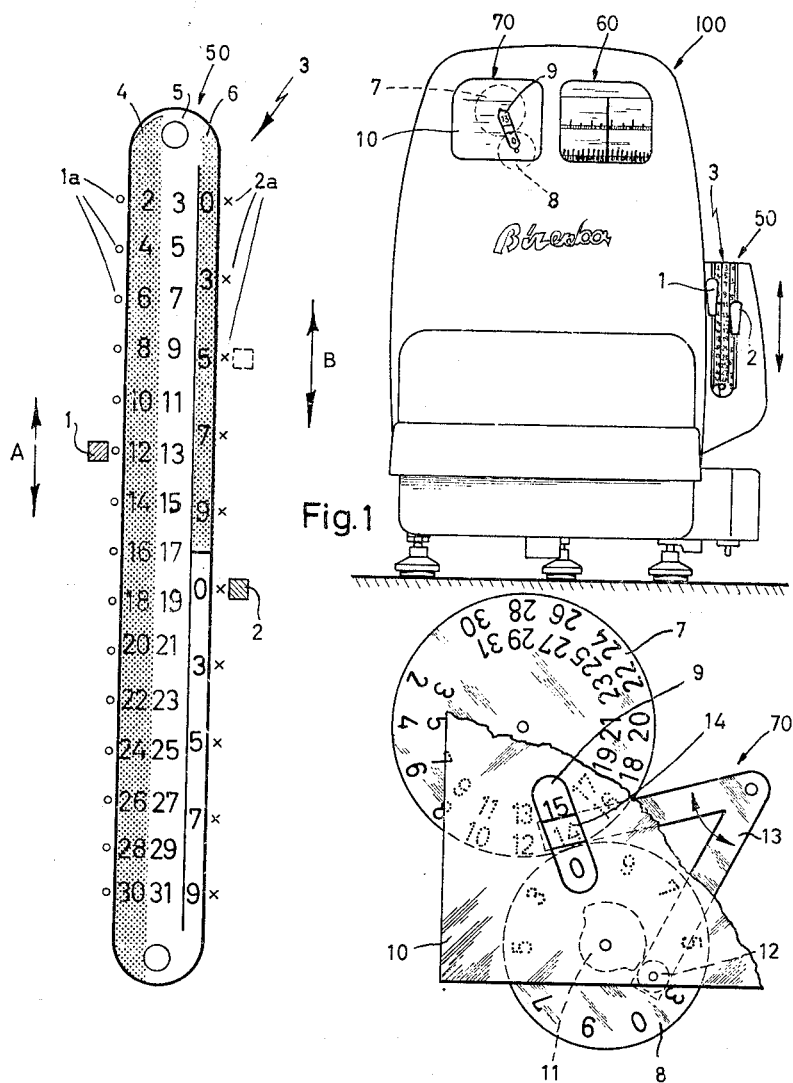

INVENTOR
ERNST KUHNLE
Nolte & Nolte
BY
ATTORNEYS

United States Patent Office 3,092,314
Patented June 4, 1963

3,092,314
PRICE INDICATING WEIGHING APPARATUS
Ernst Kuhnle, Balingen, Germany, assignor to Bizerba-Werke Wilhelm Kraut KG, Balingen, Wurttemberg, Germany
Filed Oct. 6, 1960, Ser. No. 60,896
Claims priority, application Germany Oct. 14, 1959
4 Claims. (Cl. 235—61)

This invention relates to weighing apparatus such as scales and is particularly concerned with a price setting arrangement on price-indicating weighing apparatus of the kind wherein the price of the unit of weight is adjustable on a setting device or arrangement and viewed on a projected scale or the like on the body of the weighing apparatus for the convenience of the operator and/or customer.

In setting arrangements on price-indicating weighing apparatus, space is an important consideration as necessarily a large number of different price values should be indicated. The disadvantage of known price setting arrangements is that, due to the limited space available, only a very limited number of price values or positions can be adjusted or set on the setting device and thus viewed on the scale, so that as a result known price-indicating weighing apparatus is effective for a relatively limited unit price range only.

It is a primary object of this invention to provide a price setting arrangement on price-indicating weighing apparatus on which a large number of unit or base price values can be set and viewed without increasing the volume of the weighing apparatus proper.

It is another object of this invention to provide a setting arrangement for price-indicating weighing apparatus, wherein the unit price may be set in a very simple and rapid manner and which is of simple, inexpensive and rugged construction.

Finally, it is an object of this invention generally to improve on price-setting arrangements for price-indicating weighing apparatus.

These and other objects and advantages of this invention will become apparent from the following detailed description when read in conjunction with the accompanying drawings, wherein:

FIG. 1 is a schematical elevation of a price-indicating weighing apparatus or scale embodying the inventive setting arrangement;

FIG. 2 is a somewhat schematical view of part of the setting arrangement proper;

FIG. 3 shows a viewing device to be used in conjunction with the setting arrangement of FIG. 2 for indicating the unit price of the goods to be weighed;

Figure 4:
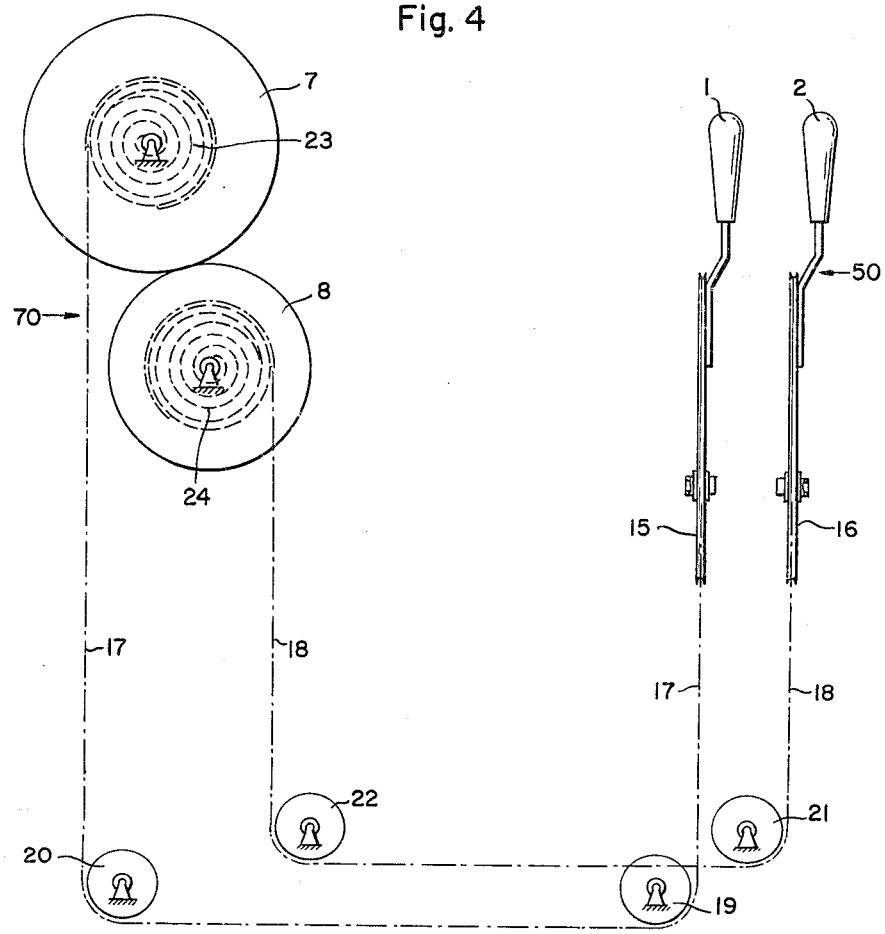
FIG. 4 illustrates the connection between the setting arrangement and the viewing device.

Briefly, the inventive setting arrangement comprises two setting levers or pointers which are settable in several positions along respective setting scales of numerical values. One of the pointers is associated with a single scale of numerical values which indicate the last digit of the integer corresponding to the price value to be set, while each setting position of the other pointer is associated with two consecutive numerical values one of which indicates the preceding digit of said integer. The single scale comprises two identical sequences of numerical values.

The pointers are operatively connected by transmitting means to indicating members on a device viewable by the customer on the weighing apparatus proper. The arrangement is such that when the pointer associated with the single scale points to a number in the first numeral sequence thereof the other pointer becomes associated with the first of the consecutive numerical values; and when the first-mentioned pointer points to a number in the second sequence of its scale, the other pointer is associated with the second row of consecutive values. The compounded numerical values are then viewed as the integer corresponding to the unit price.

Referring now to the drawings, a weighing apparatus or scale 100 is generally indicated in FIG. 1. As the construction of the weighing apparatus proper does not form part of this invention, it has not been shown. The only part thereof appearing is a scale viewing device 60 from which the total weight of the goods can be ascertained. Next to this device is a device 70 for ascertaining the price per unit weight, as will be explained hereunder in detail.

The inventive setting arrangement is generally indicated by reference numeral 50 and has been schematically illustrated on an enlarged scale in FIG. 2. The setting arrangement 50 comprises two levers or pointers 1 and 2 (see FIG. 1) which, in FIG. 2, have been shown as blocks. These levers or pointers 1 and 2 are manually movable in the direction of the double arrows A and B parallel to a scale member generally indicated by reference numeral 3. The respective pointers 1 and 2 may be set along this scale into a plurality of setting positions opposite the numbers on the scale member 3 as indicated by circles 1a and crosses 2a, respectively. In practice, the pointers 1, 2 may be positively locked in the setting positions as by suitable grooves or the like as is well known in the art.

It will be noted that the scale member 3 comprises three parallel juxtaposed scale columns 4, 5 and 6, respectively. Each scale column contains a plurality of numerical values. Pointer 1 is associated with scale columns 4 and 5, while pointer 2 pertains to scale column 6.

The pointers are operatively connected on the one hand with the scale viewing device 60 and on the other hand with the device 70 for viewing the price value of the unit of weight. The pointers can be set according to the price value of the unit of weight, and this setting of the pointers can be supervised by means of device 70 for viewing the unit price value. By setting the pointers, the scale viewing device is correspondingly adjusted, then the weighing operation may begin, whereby the scale viewing device shows the total price of the real weight of the respective products.

Scale column 6 and thus pointer 2 indicate the last digit and pointer 1 the preceeding digits of the integer or numerical value corresponding to the unit price to be set. The numerical value to which pointers 1 and 2 point are thus compounded to form the integer corresponding to the unit price value.

It should be noted that the numerals appearing in columns 4, 5 and 6 are arbitrarily selected so as to represent most frequently used digits of unit-price values. The numbers omitted (e.g. "1" in column 4 or "1," "2," "4," etc. in column 6) can be dispensed with. It will be understood, however, that the numerical scale values may be varied without departing from the scope of the invention.

As previously pointed out, the scale member 3 has three juxtaposed scale columns 4, 5 and 6, each containing several numerical values. The numerical values of the first two columns 4 and 5 are associated with the setting positions 1a of the setting pointer 1 while the numerical values of the right hand column 6 are associated with the setting positions 2a of the setting pointer 2. It will be noted that if scale columns 4 and 5 are read transversely, two adjacent numbers are always consecutive, that is 2, 3; 4, 5; 6, 7; etc. On the other hand, the sequence of the numbers in the right hand column 6 is repetitive. In other words, the numbers 0, 3, 5, 7, 9 as shown in the upper half of column 6 are repeated in the same sequence in the lower half of the column.

According to the invention, the arrangement is that each setting position 1a of the setting lever 1 may pertain to either of the two adjacent and consecutive numerical values, dependent on the position of setting lever 2. Thus, if the setting lever 1 is, for example, set in the position shown in FIG. 2, it is set to be associated with either the number 12 or the number 13. Setting pointer 2, on the other hand, in each setting position covers a single number only, corresponding to the last digit of the value to be set. However, as will be apparent from FIG. 2, if setting pointer 2 is moved from the upper half to the lower half two different setting positions for the same numerical value can be obtained. Thus, as shown in FIG. 2, setting lever 2 is set to be associated with the number 0 in the lower half of column 6. If, however, setting lever 2 is moved to the upper half of column 6, a second setting position for the number 0 could be obtained. The transmission and connecting members between the setting levers or pointers 1 and 2 and the unit price viewing device 70 are constructed and arranged in such a manner (see FIG. 3) that when the setting lever 2 is set within the upper numerical sequence of scale portion 6, then it is associated with the pointer 1 as pertaining to the numerical values of column 4, while when the setting lever 2 is in the lower half of column 6 it pertains to pointer 1 as associated with the numbers in column 5.

Thus, it will be realized from the above that the pointer positions 1 and 2 shown in FIG. 2, when considering the solid line position of lever 2, indicate the value "130" while the numerical value corresponding to the position of lever 1 and pointer 2 as shown in dotted lines is "125." Thus, if a unit price of $1.30 is to be chosen, the position of the pointers 1 and 2 in full lines as shown in FIG. 2 will be set. If, however, a base price of $1.25 is to be indicated, the same position of setting pointer 1 will be maintained but lever 2 will be moved to the dotted position.

The arrangement on the body of the weighing apparatus 100 for the purpose of viewing the price value of the weight unit, as set on the setting arrangement of FIG. 2 is shown on the body of the weighing apparatus is shown schematically in FIG. 1 at 70 and on an enlarged scale also in FIG. 3. This viewing or indicating device comprises two rotatable discs 7 and 8 which are arranged below a cover plate 10 on the body of the weighing apparatus proper. Cover plate 10 has a viewing window 9 as seen in FIGS. 2 and 3. Disc 7 is provided with two rows of numbers, adjacent numbers being consecutive in radial direction as will be seen in FIG. 3. Thus, the number pairs 6—7, 8—9, 10—11, and so on, are indicated on disc 7. It will be noted that the pairing of the disc 7 corresponds to that of scale columns 4, 5 in FIG. 2. Disc 8 has a single row of figures comprising two identical sequences corresponding to scale column 6. Thus, disc 7 substantially corresponds to columns 4, 5 while disc 8 corresponds to column 6. Disc 8 carries a cam 11 which through a roller 12 and a two-armed lever 13 actuates a mask 14. The arrangement is such that when a number of the first numerical sequence of disc 8 is set so as to appear in the window 9, the corresponding number of the inner numerical row on disc 7 is covered by the mask 14. If, however, the same number in the second sequence of disc 8 is viewed, the mask covers the corresponding numerical value in the outer row on disc 7.

It will be realized that the invention provides a very simple and ingenious manner of setting price values on a scale or weighing apparatus which can be viewed on the weighing apparatus proper in any manner known per se.

Without requiring additional space, a large number of setting positions for both pointers or levers can be provided. Thus, if, for example, fifteen setting positions are provided for the first pointer and ten setting positions for the second pointer, one hundred fifty different values may be set and viewed. This is much more than has been feasible in known apparatus.

Figure 5:
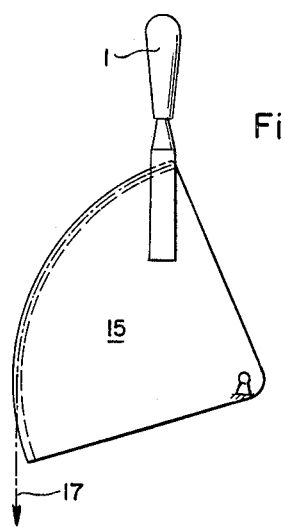
FIG. 5 is a side view of one of the setting levers appearing in FIG. 4.

The connection between the setting members 1 and 2 displaceable along the scale member 3 according to FIG. 2 and the viewing device 70 may be made by ropes or cables. FIGS. 4 and 5 illustrate a preferred embodiment of the connection between the setting arrangement 50 and the viewing device 70. The arrangement is such that when displacing the setting members according to the price of the unit of weight of the respective merchandise, the viewing device is allotted to the respective scale on the transparent plate by being correspondingly displaced therealong, whereupon the weighing operation may begin.

The connection between the levers 1 and 2 of the setting arrangement 50 and the device 70 for viewing the price value of the unit of weight of the goods to be weighed is effectuated by means of ropes or cables 17, 18 which on the one hand are anchored on the peripheries of respective discs or segments 15, 16 carrying the setting lever 1, 2 and are correspondingly actuated upon displacement of the levers, and which on the other hand are attached to the discs 7 and 8 of the viewing device 70 shown in FIG. 3. Between the discs 15, 16 and the discs 7, 8 the ropes or cables 17, 18 are led around respective guide rolls and tension rollers 19 and 20, 21 and 22. The segment 15 of the setting lever 1 is connected with the disc 7 and the segment 16 of the setting lever 2 is connected with the disc 8; the arrangement is such that the interconnected discs are always rotated through the same angle so that both discs may be so adjusted as to show the same numerical values. Springs 23, 24 are provided for returning the respective discs 7, 8 into their initial or normal positions.

While the invention has been described in conjunction with a preferred embodiment, it should be realized that many changes and alterations may be made without departing from the scope and spirit of the invention as recited in the claims.

What is claimed is:

1. A price-setting arrangement for a price-indicating weighing apparatus, comprising, in combination, scale means, first and second setting members settable into positions along said scale means, the latter including first, second and third scale columns of numerical values, said first and said second columns being juxtaposed to form pairs of adjacent numerical values which are consecutive, said third column comprising first and second identical numerical sequences, said first setting member being settable into positions along said first and said second columns, said second setting member being settable into positions along said third column, unit-price viewing means on said weighing apparatus, and means for transmitting the numerical values indicated by said first and said second setting members to appear as an integer on said viewing means, said integer being composed of a first part comprising a numerical value of one of said pairs and of a second part comprising a value of one of said numerical sequences, said integer comprising the first numerical value of said pair when said second setting member is in a position along said first numerical sequence and said integer comprising the second numerical value of said pair when said second setting means is in a position along said second numerical sequence, said viewing means including first and second indicating members, said first indicating member being adapted to display said first part of the integer while said second indicating member is adapted to display said second part of the integer, said viewing means further including selector means for masking one of said numerical values forming said first part of the integer depending upon the position of said second indicating member.

2. A price-setting arrangement for a price-indicating weighing apparatus, comprising, in combination, scale means including first, second and third scale columns of numerical values, said first and said second columns being juxtaposed and the adjacent numerical values thereof being consecutive, said third column comprising first and second identical numerical sequences, a first setting member settable into positions along said first and said second columns for setting all but the last digit of the value to be set, a second setting member settable into positions along said third column for setting the last digit of said value to be set, a viewing means on said weighing apparatus, first and second indicating means in said viewing means for respectively displaying said digits set by said first setting member and said last digit set by said second setting member, and transmitting means between said first and said second setting members and said first and said second indicating means, respectively, for displaying on said viewing means an integer composed of one said numerical values of said first and said second columns and a value of one of said numerical sequences of said third column, said integer comprising a numerical value from said first column when said setting member is set into a position along said first numerical sequence and said integer comprising a numerical value from said second column when said second setting member is set into a position along said second numerical sequence.

3. A price-setting arrangement according to claim 7, wherein said third column is in parallel juxtaposed relation with respect to said first and said second columns.

4. A price-setting arrangement according to claim 7, wherein said integer corresponds to the unit-price value of the goods to be weighed on said weighing apparatus, said first and second indicating means comprising respective first and second rotatable discs, said first disc having two coaxial rows of adjacent numerical values while said second disc has a single row of first and second identical numerical sequences, a window for compound viewing of one numerical value of each of said rows, said second disc having cam means cooperating with lever means, said lever means carrying a mask positioned in said window, said mask covering the numerical value of one of said coaxial rows when the adjacent numerical value of the other coaxial row is to be viewed, and conversely.

References Cited in the file of this patent

UNITED STATES PATENTS

| | | |
|---|---|---|
| 2,441,261 | Eaton | May 11, 1948 |
| 2,661,903 | Goldbach | Dec. 8, 1953 |
| 2,712,413 | Hayek | July 5, 1955 |

FOREIGN PATENTS

| | | |
|---|---|---|
| 126,436 | Great Britain | May 5, 1919 |